United States Patent
Lee et al.

(10) Patent No.: US 7,188,773 B2
(45) Date of Patent: *Mar. 13, 2007

(54) REMOVABLE COVER FOR AN ELECTRONIC DEVICE

(75) Inventors: Roland Lee, Flushing, NY (US); Terry Lee, Nan-Tou (TW); Quintin Morris, Reading (GB); Jorge Schlieffers, Streatley-on-Thames (GB); Katrika Woodlock, Reading (GB)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/262,612

(22) Filed: Oct. 31, 2005

(65) Prior Publication Data

US 2006/0065736 A1    Mar. 30, 2006

Related U.S. Application Data

(63) Continuation of application No. 10/955,625, filed on Sep. 30, 2004, now Pat. No. 6,988,664.

(51) Int. Cl.
*G06K 7/10*    (2006.01)

(52) U.S. Cl. .............................. 235/472.01; 235/462.45
(58) Field of Classification Search ........... 235/462.01, 235/462.43, 462.45, 472.01
See application file for complete search history.

(56) References Cited

U.S. PATENT DOCUMENTS

| 5,532,466 | A  | * | 7/1996 | Konno et al. ................ 235/441 |
| 5,960,208 | A  | * | 9/1999 | Obata et al. ................ 713/330 |
| 2001/0003071 | A1 | * | 6/2001 | Mansutti et al. ............ 439/133 |
| 2004/0182935 | A1 | * | 9/2004 | Russell et al. ......... 235/472.01 |

* cited by examiner

*Primary Examiner*—Thien M. Le
*Assistant Examiner*—April A. Taylor
(74) *Attorney, Agent, or Firm*—Fay Kaplun & Marcin, LLP

(57) ABSTRACT

Described is an electronic device which includes a body, an optical opening in the body and a removable cover. The body contains an optical scanner and a slot for a removable integrated circuit ("IC") card. The optical opening provides an optical path from an external environment to the optical scanner. The removable cover which, when in a closed position coupled to the body, covers the slot and the optical opening. The cover includes a cover opening extending therethrough and, when the cover is in the closed position, the cover opening is aligned with the optical opening to permit light to enter and exit therethrough.

22 Claims, 3 Drawing Sheets

REMOVABLE COVER FOR AN ELECTRONIC DEVICE

Priority is claimed to continuation of U.S. patent application Ser. No. 10/955,625 filed Sep. 30, 2004 now U.S. Pat. No. 6,988,664 "Removable Cover for an Electronic Device". The entire disclosure of this prior application is considered as being part of the disclosure of the accompanying application and is hereby expressly incorporated by reference herein.

FIELD OF THE INVENTION

The present invention relates to portable electronic devices, and in particular to scanner optical windows of portable barcode scanners.

BACKGROUND OF THE INVENTION

Portable computing devices have become an integral part of modern life, both as related to business activities and also for recreational purposes. In many cases, these devices combine multiple functions, such as computing, storing addresses, storing data, processing electronic mail and messages, and executing applications. Increasingly, more specialized functions are also carried out by these portable devices, such as scanning bar codes of products and merchandise. Such more specialized functions are useful to consumers, as well as to business users and manufacturers to keep track of inventories, products, etc.

Portable barcode scanners are designed to satisfy several design requirements which are often conflicting. These devices have to be rugged, since it is likely that during their operational lifetime they will be inadvertently dropped, crushed and otherwise abused by the operators. At the same time, the devices have to be sufficiently light so that they can be easily transported and used, without causing undue interference in the user's activities. Portable barcode scanners also are designed to be inexpensive, to lower the acquisition cost to the user, and to facilitate replacement of damaged or defective units.

In most respects, the barcode scanners can be manufactured with a shell (e.g., body) of tough polymers which are impact resistant. The shell may be formed of few parts, which are then assembled to produce a tough, somewhat fluid resistant shell to contain the more delicate internal electrical components. However, at least one opening is necessary in the portable barcode unit to permit the scanner to "see" the barcode indicia of a target product, good or device. A window typically covers the opening. The window is generally transparent to permit the visual scanner to work, and often cannot be made of the same material as the body of the device. It is thus necessary to affix the protective window over the opening in a manner that is inexpensive, and at the same time results in a strong bond giving the window shock proof properties similar to those of the rest of the device's shell.

SUMMARY OF THE INVENTION

The present invention relates to an electronic device which includes a body, an optical opening in the body and a removable cover. The body contains an optical scanner and a slot for a removable integrated circuit ("IC") card. The optical opening provides an optical path from an external environment to the optical scanner. The removable cover which, when in a closed position coupled to the body, covers the slot and the optical opening. The cover includes a cover opening extending therethrough and, when the cover is in the closed position, the cover opening is aligned with the optical opening to permit light to enter and exit therethrough.

DETAILED DESCRIPTION

Figure 1:
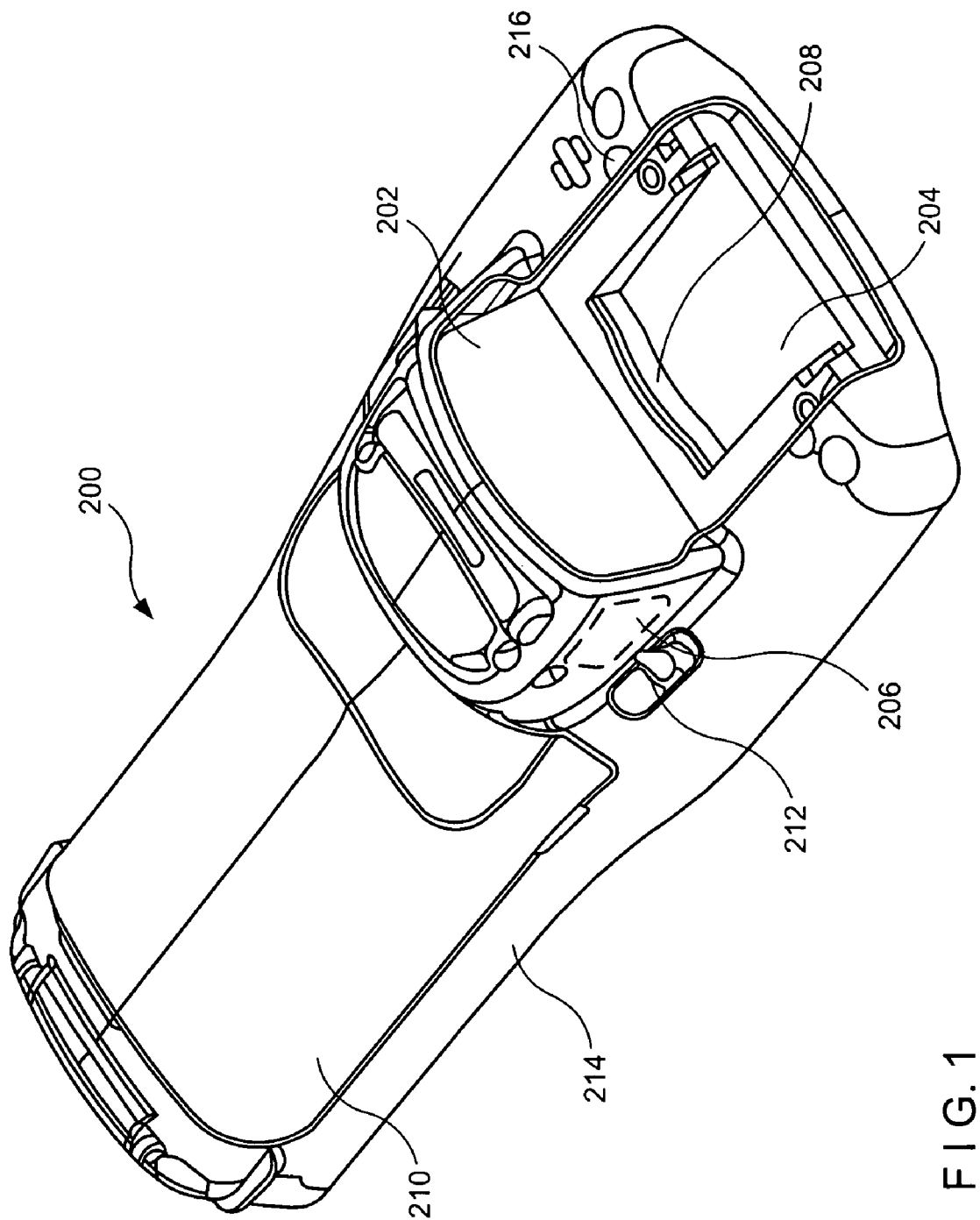
FIG. 1 is a perspective view of an electronic device without a removable cover, according to the present invention.

The present invention may be further understood with reference to the following description and the appended drawings, wherein like elements are referred to with the same reference numerals. Modern developments in the miniaturization of electronics have brought to the market a wide range of portable hand held devices that can perform many functions. These electronic devices combine multiple functions to provide the user with great flexibility in how to use them. For example, portable electronic computers have been given additional functionalities, such as the ability to scan the barcodes found on products, merchandise, goods, or almost anything that it is useful to track and identify.

These portable electronic devices have found extensive use as consumer electronics, used for example for shopping assistance, to give shoppers the ability to identify any product having a barcode, and to access data regarding that product, such as price, description, availability, etc. These devices are also extensively used as work tools, which can be employed in the field to perform business functions. For example, store personnel can perform inventory management of goods and products for sale, of raw materials, and of any assets which can be marked with a barcode. Barcode scanners may also be used to track parts through a manufacturing process, audit prices, and to keep track of maintenance and repair operations. When combined with an electronic processor, with a local memory and with wireless access to a remote database, these devices may be used to provide a real time picture of the assets and inventory of a business.

One device which combines several of the functions described above is the MC 1000 terminal manufactured by Symbol Technologies of Holtsville, N.Y. This terminal combines several electrical and electronic components such as an optical scanner capable of reading two and three dimensional barcode indicia, a data entry device (e.g., a keyboard), a data display device (e.g., a screen or visual display) and an electronic processor, in a single portable device. The processor may be optimized to analyze the data read by the scanner, correlate it with existing databases, and/or control communication functions of the device with an external network, for example through a wireless transmitter.

One advantage of the devices described above is that they are portable, and can perform their functions without wired connections to other devices or systems. For example, the portable electronic devices may be able to connect to wireless public networks, to private networks and to dedicated networks, such as those operated by a company or business. To retain the portability of the devices, power is typically provided by batteries, thus dispensing with the need to use wires connected to a stationary power source. To maximize the flexibility of the portable electronic devices described above, it is necessary to insure that they are lightweight and damage resistant.

Since the electronic devices are carried by the user, possibly for extensive periods of time, it is important that their weight be reduced to a minimum. Portable devices that are too heavy may interfere with the user's normal activities, and thus become less effective. At the same time, portable electronic devices are likely to be dropped, crushed or otherwise unintentionally abused by the operator. It is thus necessary to manufacture devices which can withstand a great degree of abuse, without being damaged or becoming unusable. In addition to these requirements, minimizing the cost of the portable electronic devices is another consideration during their design and manufacture. These design requirements are often contradictory, and pose difficult challenges to the engineers and designers.

One area which provides a design challenge is an optical opening formed in the body of an electronic device to provide an optical path for illumination of a barcode indicia from a light source or laser, and also to collect the reflected light from the indicia, so it may reach an optical scanner (e.g., optical sensor). A device window closes the optical opening of the device's body to prevent contaminants and moisture from entering in contact with the electronic components, and also protects those fragile components from being damaged by collisions. Since the device window is a separate component from the rest of the body, a challenge lies in securing it to the surrounding structure in an inexpensive, light and yet strong manner. Successfully achieving these design parameters enables the portable barcode scanning device to be light, inexpensive, and to be able to withstand damage due to normal use likely to take place.

Conventionally, the device window of the portable barcode scanning device is held in place over the optical opening with an adhesive compound or with a double sided adhesive tape. However, that method is not sufficient to ensure that the device window will not detach in case of dropping of the unit, or other abuse which the portable device may suffer. Accordingly, a typical solution has been to add a bezel to retain the device window in place, and to affix the bezel to the body of the portable device by ultra sonic welding, or other similar bonding method. This approach to securing the device window is costly, and also time consuming, since the welding process has to be tuned for the product. This results in an excessive cost of the finished portable barcode scanning device.

One way of reducing the cost of a manufactured device is to reduce the number of parts which are used during the assembly. Another is to simplify the assembly methods. According to exemplary embodiments of the present invention, a removable element of a hand held barcode scanner is modified to be used as an anchoring element of the device window described above. In one exemplary embodiment, a cover used to close a chamber designed to contain a removable electronic integrated circuit (IC) card is extended to form a frame, which is placed over the device window to help hold the device window in place over the optical opening. The removable IC card may be a memory storage device, an IC component to carry out some function, or other IC device. For example, a Secure Digital (SD) card, a Compact Flash (CF) card, or other format of removable memory may be included in the device. Alternatively, an IC card which performs some function, such as Global Positioning System (GPS) locator, wireless transmitter, etc. may be connected to the barcode scanner via a slot such as a CF or SD slot. The cover thus protects the IC card when it is present, and closes the card's slot when not in use.

Figure 2:
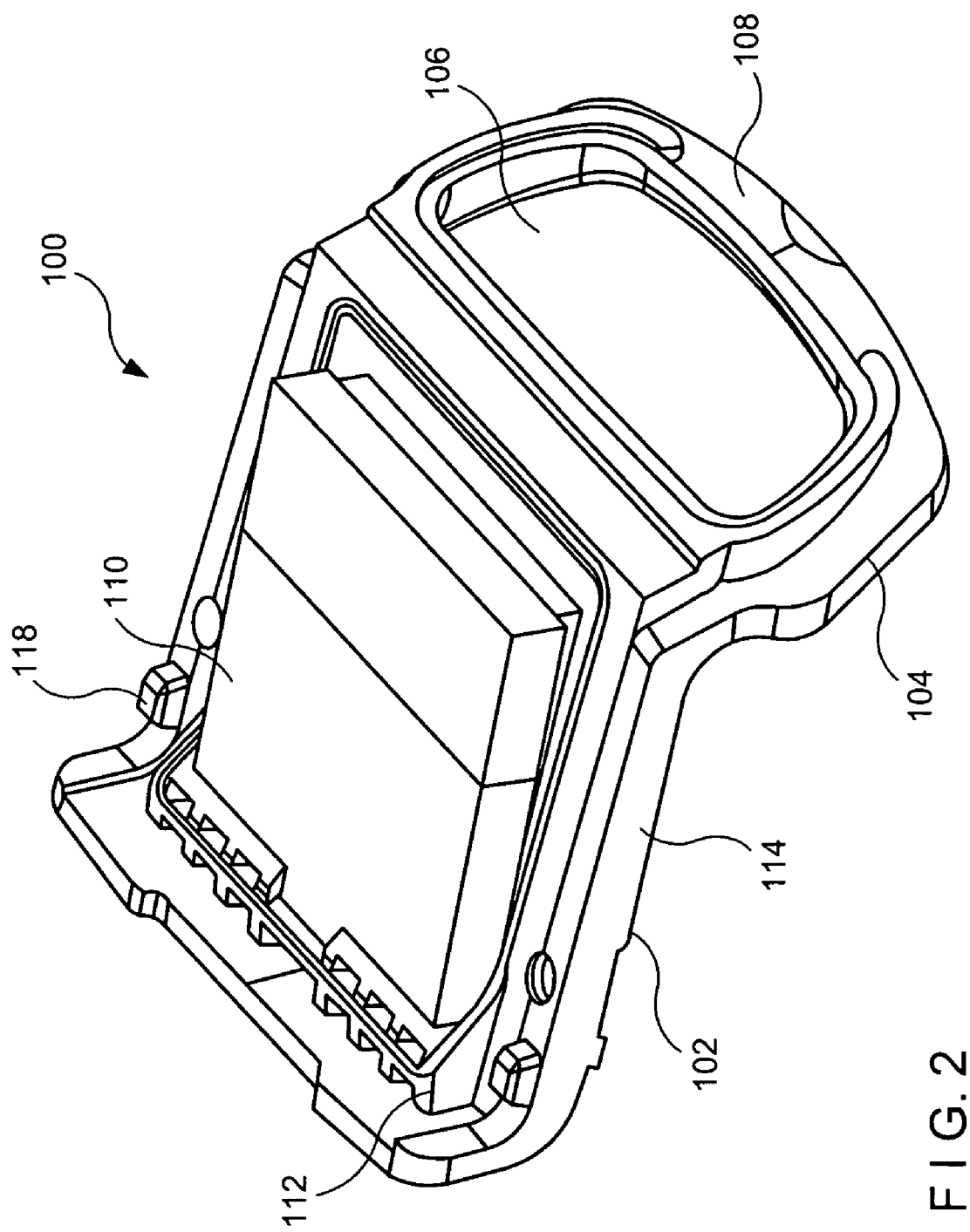
FIG. 2 is a perspective view showing a removable cover according to the present invention.

An exemplary embodiment of a combined slot cover and device window fixation frame according to the invention is shown in FIG. 2. The combined slot cover and device window fixation frame forms a removable cover 100 of the portable device, which may be constructed of a single, unitary module to ensure the strength and integrity of the removable cover 100. The material used for the removable cover 100 may be the same as that of the overall shell of the portable electronic device, and may comprise a polymer which is impact resistant. The removable cover 100 includes, for example, a slot cover portion 102 and a fixation frame portion 104. The two portions may be joined together after being shaped, or may be formed from the same piece of structural material.

The slot cover portion 102 may comprise a peripheral element 114 which defines the shape and size of the cover. A cover surface 116 may be placed over the peripheral element 114, or may be formed integrally with the peripheral element 114 from a shaped piece of structural material. A retaining element 110 may be included on the lower side of the cover surface 116, facing the body of the portable device. For example, the retaining element 110 may be adapted to retain in place an SD card, or other type of removable IC card connected to the portable device, as will be described below. The retaining element 110 may comprise, for example, a foam-like or sponge-like material, which is designed to apply a pressure to the removable IC card and to limit the card's movement.

The fixation frame portion 104 comprises a bezel 108, circumscribing a cover opening, having a shape and dimensions adapted to overlie the outer periphery of the optical opening of the electronic device (e.g., portable barcode scanner). A cover window 106 (e.g., a transparent portion) may also be provided (e.g., in the cover opening), which substantially matches the size of the optical opening. The cover window 106 is formed of a material which is transparent, for example, to the radiation emitted by the optical system of a portable barcode scanner, and not necessarily to a visible light frequency. The cover window 106 may also perform a structural role within the fixation frame portion 104, and thus may be formed of a material having sufficiently strong mechanical properties to contribute to the stiffness of the bezel 108. In addition, the cover window 106 may form a protective shield for the optical opening it covers, preventing damage due to impacts with external objects.

The removable cover 100 may comprise a gasket 112 disposed along the cover's periphery. The gasket 112 forms a seal against dirt, liquids, and other contaminants between the removable cover 100 and the electronic device on which the cover is mounted. The gasket 112 may be formed of any conventional material which is suitable for the specific application. For example, the material may be flexible, water resistant, and/or may be useful in dampening vibrations. Gasket 112 may also act as a shock absorber, by dampening impacts on the removable cover 100, and reducing the amount of force transmitted to the electronic device.

FIG. 1 shows an exemplary embodiment of a portable electronic device 200 according to the present invention, with the removable cover 100 removed. The portable electronic device 200 may be, for example, a portable barcode scanner. The portable electronic device 200 comprises a body 214 formed of a resilient material, which may be similar or identical to the material forming the removable cover 100. The portable electronic device 200 comprises an optical scanner 206 (e.g., a scanning engine) contained in the body 214. A device window 202 is provided to let the laser radiation (or other optical energy) emitted by the optical scanner 206 to exit the device via the optical opening and be directed to the barcode indicia which is to be scanned. The device window 202 also permits the laser light reflected by the indicia to enter the body 214 and be detected by sensors of the optical scanner 206. A battery 210 may be provided to power the barcode scanner 200. The device window 202 is formed of a material which is transparent to the radiation frequency used by the optical scanner 206.

The portable electronic device 200 is fitted with a slot 208 adapted to receive a removable IC card. The IC card may be operatively placed in electrical contact with an electronic processor of the barcode scanner 200, with the optical scanner 206, or with other electronic components of the barcode scanner 200. For example, the IC card may be a SD card, a flash memory card, a CF card, an XD card, or any other type or removable memory device formed on an IC card. Alternatively, the slot 208 may be used to connect an external device to the barcode scanner 200. For example, devices using a CF card connection may be used, such as an external transmitter/receiver, a GPS positioning device, a wireless network adapter, etc. A chamber 204 may be provided within the body 214 to house the card or device connected to slot 208. Release actuators 212 may be provided to facilitate the removal of the IC card from the slot 208, for example by releasing the appropriate locks, and by pushing the card out of the slot 208. In addition, release actuators 212 may release the cover locks 216, which are used to retain the removable cover 100 over the chamber 204.

Figure 3:
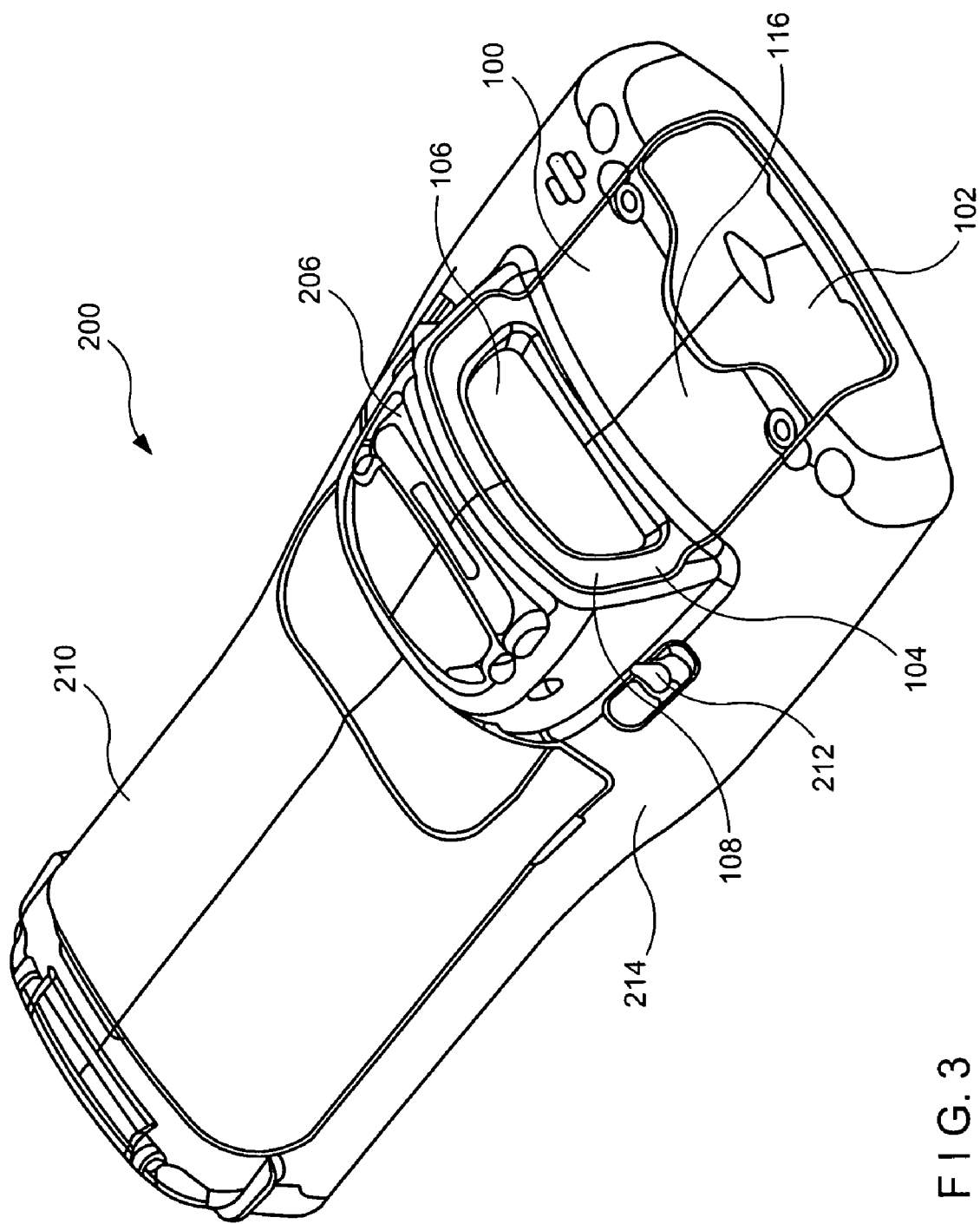
FIG. 3 is a perspective view showing the electronic device of FIG. 1 with a removable cover according to the present invention.

FIG. 3 shows the complete assembly of the portable electronic device 200, together with the removable cover 100 in place over the chamber 204. As shown, the bezel 108 forms a frame around the periphery of the device window 202, and the cover window 106 substantially overlies the device window 202. In a different embodiment, the removable cover 100 does not have a cover window 106, and only the bezel 108 is placed over device window 202. Bezel 108 presses the device window 202 in place against its seat, which is formed on the body 214. The device window 202 is thus prevented from separating from the rest of the barcode scanner 200, even in case of a shock or other event which might otherwise break the device window 202 away from the body 214. The bezel 108 supplements the adhesive which normally secures in place the device window 202 by providing a mechanical force retaining in place the device window 202.

In this exemplary embodiment, the slot cover portion 102 is seated over the chamber 204, and is adapted to cover and protect from the external environment an SD card which can be inserted in the slot 208. The SD card in this example is a removable memory card, which can be used, for example, to store information regarding the products, goods, or other assets that are scanned by the portable electronic device 200. The removable cover 100 may be used whether or not the SD card is actually present in the device. The bezel 108 can be locked to the body 214 and retains the device window 202 in place even if the SD card has been removed from slot 208. Any known method of mechanically attaching the removable cover 100 to the body 214 may be used. For example, protrusions 118 may be locked in place by cover locks 216, and various lip/groove arrangements and frictional engagement means may be used to further secure the cover 100 in place.

The removable cover 100 in this exemplary embodiment forms a cover for the SD card fitted in chamber 204. However, more generally, the fixation frame portion 104 may be extended from any removable portion of the body 214. For example, the bezel 108 may be combined with a covering for a battery compartment, an access to an electronic connection, or an inspection panel used to test or calibrate the electronic components of the device, such as the barcode optical scanner 206. Accordingly, the combination of the fixation frame portion 104 with the SD card cover is simply exemplary, and is not intended to limit the invention to an SD card cover.

The exemplary embodiments of the present invention provide a variety of advantages. The bezel of the removable cover applies a mechanical force which retains the device window of the barcode scanner's optical system (e.g., optical scanner) in position. The mechanical pressure is more effective at maintaining the device window in place than the conventional adhesives, particularly during impacts such as those caused by dropping the portable barcode scanner, or dropping something on the device. Combining the bezel with a cover used to close the optical opening of the barcode scanner also provides advantages, for example by reducing the number of parts forming the barcode scanner. In the exemplary embodiment, a cover for a chamber containing an SD memory card is integrated with the bezel. Combining the functions of two components into one part reduces the cost of the device, and simplifies its manufacturing.

The present invention has been described with reference to specific exemplary embodiments. Those skilled in the art will understand that changes may be made in details, particularly in matters of shape, size, material and arrangement of parts without departing from the teaching of the invention. For example, different configurations of the barcode scanner, of the device window and of the IC card may be used. Accordingly, various modifications and changes may be made to the embodiments without departing from the broadest scope of the invention. The specifications and drawings are, therefore, to be regarded in an illustrative rather than a restrictive sense.

What is claimed is:

1. An electronic device, comprising:
    a case situating an optical device and having a slot for an electronic component, the case defining an optical opening that provides an optical path from an external environment to the optical device; and
    a cover covering the slot and the optical opening in the case, the cover defining a cover opening that aligns with the optical opening to permit light to enter and exit therethrough.

2. The electronic device according to claim 1, further comprising:
    a device window which, when the cover is in the closed position, is held in place over the optical opening by the cover.

3. The electronic device according to claim 2, wherein the cover further includes a gasket surrounding the cover opening for contacting the device window.

4. The electronic device according to claim 2, wherein the cover includes a bezel which, when the cover is in the closed position, pushes the device window against a corresponding seat formed in the case.

5. The electronic device according to claim 4, wherein the bezel substantially overlies.

6. The electronic device according to claim 1, wherein the cover includes a cover window overlying the optical opening, the cover window being substantially transparent. a periphery of the device window.

7. The electronic device according to claim 1, wherein the electronic component includes a removable integrated circuit ("IC") card.

8. The electronic device according to claim 1, wherein the optical device includes a barcode reader scanner.

9. The electronic device according to claim 1, further comprising:

a releasable lock attaching the cover to the body.

10. The electronic device according to claim 1, wherein the cover further includes an electronic component retaining portion which, when the cover is in the closed position, limits movement of the electronic component.

11. The electronic device according to claim 1, wherein the optical device includes an imaging sensor of a digital camera.

12. A removable cover for an electronic device which includes a case that situates an optical device and has a slot for an electronic component, wherein the case defines and optical opening that provides an optical path from an external environment to the optical device, the cover comprising:

a fixation frame portion having a cover opening to allow light to enter and exit therethrough; and a cover portion unitary with the fixation frame portion, wherein, when the cover is coupled to the device, the fixation frame portion mechanically retains in place a device window of the device over the optical opening and the cover portion closes the slot.

13. The removable cover according to claim 12, further comprising:

an attachment element releasably coupling the cover to the device.

14. The removable cover according to claim 12, further comprising:

a gasket surrounding the cover opening for contacting the device window.

15. The removable cover according to claim 14, wherein the gasket includes at least one of a shock absorbing material and a fluid resistant material.

16. The removable cover according to claim 12, further comprising:

a bezel pushing the device window against a corresponding seat formed in the body.

17. The removable cover according to claim 16, wherein the bezel substantially overlies a periphery of the device window.

18. The removable cover according to claim 12, further comprising:

a cover window overlying the optical opening, the cover window being substantially transparent.

19. The removable cover according to claim 12, wherein the optical device includes a barcode reader scanner.

20. The removable cover according to claim 12, wherein the optical device includes an imaging sensor of a digital camera.

21. The removable cover according to claim 12, further comprising:

an electronic component retaining portion which, when the cover is in the closed position, limits movement of the electronic component.

22. A portable optical barcode scanner, comprising:

a resilient body;

a barcode scanning engine disposed within the resilient body;

a window of the resilient body providing an optical path to the barcode scanning engine;

an electronic component slot of the resilient body;

a structural cover releasably attachable to the resilient body;

a fixation frame portion of the structural cover mechanically retaining the window in place; and a slot cover portion of the structural cover enclosing the electronic component slot.

* * * * *